US 11,698,203 B2

(12) United States Patent
Okamoto et al.

(10) Patent No.: US 11,698,203 B2
(45) Date of Patent: Jul. 11, 2023

(54) AIR-CONDITIONING SYSTEM

(71) Applicant: DAIKIN INDUSTRIES, LTD., Osaka (JP)

(72) Inventors: Yasunori Okamoto, Osaka (JP); Naotoshi Fujita, Osaka (JP); Kouji Tatsumi, Osaka (JP); Masaaki Kawagishi, Osaka (JP); Shinya Umase, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/500,412

(22) Filed: Oct. 13, 2021

(65) Prior Publication Data
US 2022/0042702 A1    Feb. 10, 2022

Related U.S. Application Data

(63) Continuation of application No. PCT/JP2020/003295, filed on Jan. 30, 2020.

(30) Foreign Application Priority Data

May 31, 2019   (JP) ................... 2019-102465

(51) Int. Cl.
*F24F 11/46*   (2018.01)
*F24F 11/86*   (2018.01)
(Continued)

(52) U.S. Cl.
CPC ............. *F24F 11/46* (2018.01); *F24F 3/044* (2013.01); *F24F 11/54* (2018.01); *F24F 11/65* (2018.01);
(Continued)

(58) Field of Classification Search
CPC .. F24F 11/46; F24F 11/86; F24F 11/65; F24F 11/54; F24F 3/044; F24F 2110/10; F24F 2110/20
See application file for complete search history.

(56) References Cited

U.S. PATENT DOCUMENTS

2014/0014297 A1* 1/2014 Kuang ..................... F24F 11/83
165/104.11
2015/0292763 A1* 10/2015 Jung ........................ F24F 11/30
700/276
(Continued)

FOREIGN PATENT DOCUMENTS

EP    3 163 219 A1    5/2017
JP    2006-145070 A   6/2006
(Continued)

OTHER PUBLICATIONS

Extended European Search Report for European Application No. 20815661.2, dated Apr. 4, 2022.
(Continued)

*Primary Examiner* — Larry L Furdge
(74) *Attorney, Agent, or Firm* — Birch, Stewart, Kolasch & Birch, LLP

(57) ABSTRACT

In an air-conditioning system including an outside air processing device and an air-conditioning device, an operation of either one of the outside air processing device or the air-conditioning device is stopped if a temperature/humidity state that is at least either the temperature or humidity of air in a target space is within a predetermined range and if the load factor of at least one of the outside air processing device or the air-conditioning device is below a predetermined lower limit.

4 Claims, 1 Drawing Sheet

(51) Int. Cl.
*F24F 11/65* (2018.01)
*F24F 11/54* (2018.01)
*F24F 3/044* (2006.01)
*F24F 110/20* (2018.01)
*F24F 140/50* (2018.01)
*F24F 110/10* (2018.01)

(52) U.S. Cl.
CPC ........... *F24F 11/86* (2018.01); *F24F 2110/10* (2018.01); *F24F 2110/20* (2018.01); *F24F 2140/50* (2018.01)

(56) References Cited

U.S. PATENT DOCUMENTS

| | | | |
|---|---|---|---|
| 2016/0109147 A1 | 4/2016 | Uno et al. | |
| 2017/0176954 A1* | 6/2017 | Salsbury | G05B 13/022 |
| 2018/0372362 A1* | 12/2018 | Turney | F24F 11/47 |
| 2019/0086113 A1 | 3/2019 | Horie et al. | |
| 2020/0080742 A1* | 3/2020 | Okamoto | G05B 15/02 |

FOREIGN PATENT DOCUMENTS

| | | |
|---|---|---|
| JP | 2012-63117 A | 3/2012 |
| JP | 2013-139905 A | 7/2013 |
| WO | WO 2014/203311 A1 | 12/2014 |
| WO | WO 2015/198741 A1 | 12/2015 |
| WO | WO 2018/182022 A1 | 10/2018 |

OTHER PUBLICATIONS

International Search Report (PCT/ISA/210) issued in PCT/JP2020/003295, dated Mar. 17, 2020.

English translation of the International Preliminary Report on Patentability and Written Opinion of the International Searching Authority for International Application No. PC/JP2020/003295, dated Dec. 9, 2021.

* cited by examiner

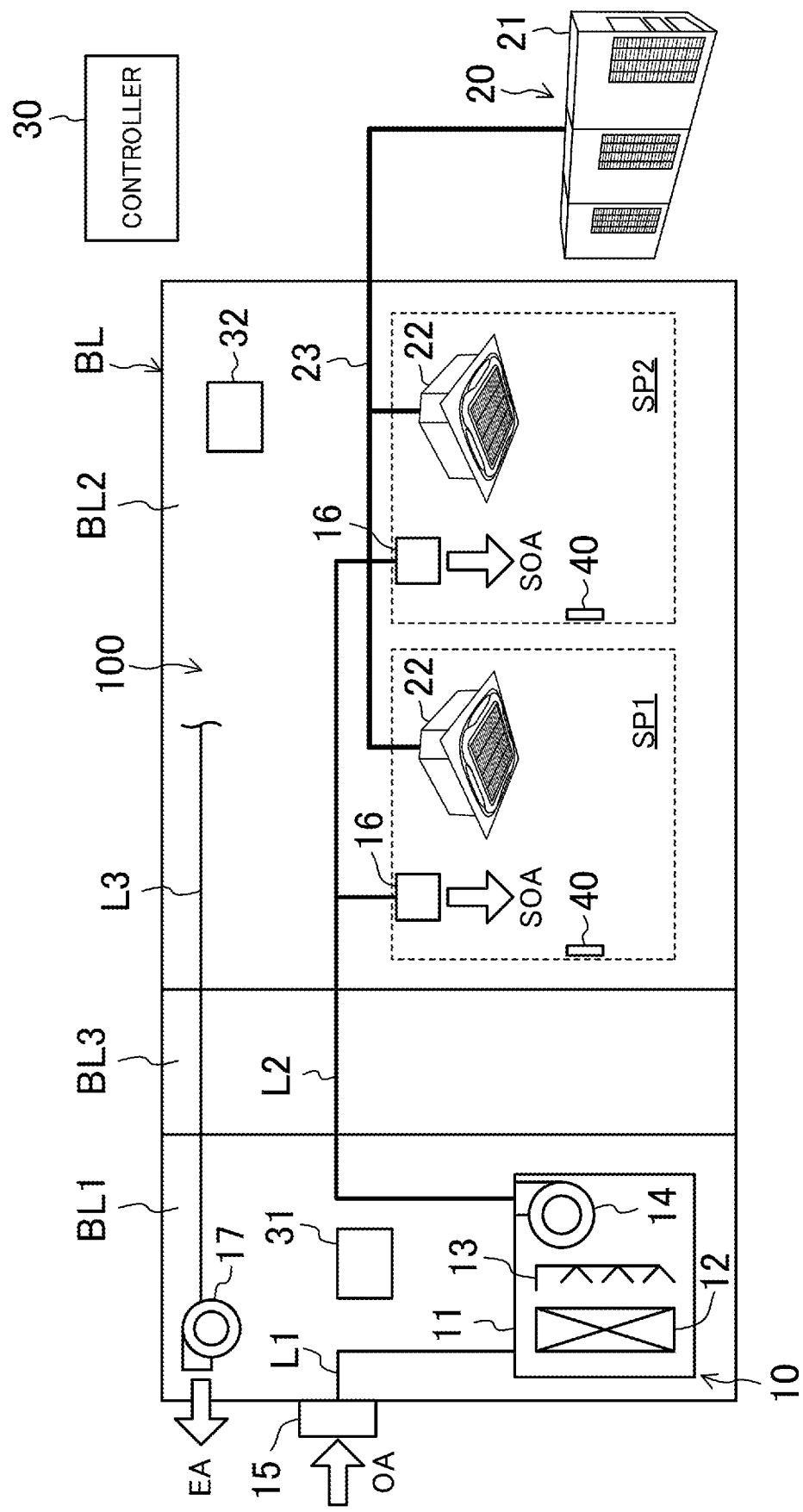

AIR-CONDITIONING SYSTEM

CROSS REFERENCE TO RELATED APPLICATIONS

This application is a Continuation of PCT International Application No. PCT/JP2020/003295 filed on Jan. 30, 2020, which claims priority under 35 U.S.C. § 119(a) to Patent Application No. 2019-102465 filed in Japan on May 31, 2019, all of which are hereby expressly incorporated by reference into the present application.

TECHNICAL FIELD

The present disclosure relates to an air-conditioning system.

BACKGROUND ART

An air-conditioning system that has been used includes an outside air processing device and an air-conditioning device. The outside air processing device heats or cools outside air, and supplies the heated or cooled air to a target space, thereby ventilating or air-conditioning the target space. The air-conditioning device heats or cools air in the target space (inside air), and sends the heated or cooled air to the target space, thereby conditioning the air in the target space.

An outside air processing device of a known air-conditioning system performs supply air temperature control to make the temperature of the supply air close to a set value and airflow rate control to make the carbon dioxide concentration in an indoor space close to a set value. An air-conditioning device of the known system performs indoor temperature control to make the indoor temperature close to a set value. In this case, these devices are basically operated independently.

Such an air-conditioning system has a very low coefficient of performance (COP) when the air-conditioning device and the outside air processing device (in particular, a chiller that determines the load) are operated at low load.

To address this problem, operation of the outside air processing device is stopped when the outside air temperature and humidity meet the condition that allows cooling with outside air in a cooling operation.

Further, Patent Document 1 discloses an air-conditioning system having a desiccant device (an outside air processing device capable of controlling humidity through batch replacement of an adsorption heat exchanger) and an air-conditioning device. In this air-conditioning system, operation of the air-conditioning device is stopped and the air conditioning capacity of the desiccant device is increased when the air-conditioning device has a low load during heating. Specifically, the humidification capacity (latent heat capacity) is reduced and the heating capacity (sensible heat capacity) is increased by making the batch replacement period of the desiccant device longer than in the normal heating and humidification.

An additional technique has been also suggested in which the load is distributed between the outside air processing device and the air-conditioning device, using the COPs and other factors of these devices to minimize the power consumed by the entire air-conditioning system. In the known technique, the load is distributed by changing the supply air temperature of the outside air processing device and the evaporation temperature in the air-conditioning device.

CITATION LIST

Patent Documents

Patent Document 1: Japanese Unexamined Patent Publication No. 2013-139905

SUMMARY

A first aspect of the present disclosure is directed to an air-conditioning system including: an outside air processing device (10) configured to adjust at least a temperature of outside air taken into the outside air processing device (10) to supply the outside air to a target space (SP1, SP2); and an air-conditioning device (20) configured to adjust at least a temperature of air in the target space (SP1, SP2), wherein if a temperature/humidity state that is at least either the temperature or a humidity of the air in the target space (SP1, SP2) is within a predetermined range, and if a load factor of at least one of the outside air processing device (10) or the air-conditioning device (20) is below a predetermined lower limit, an operation of either one of the outside air processing device (10) or the air-conditioning device (20) is stopped.

BRIEF DESCRIPTION OF THE DRAWINGS

FIG. 1 illustrates an exemplary configuration of an air-conditioning system according to an embodiment.

DESCRIPTION OF EMBODIMENTS

Embodiments of the present disclosure will be described below with reference to the drawings. The following embodiments are merely exemplary ones in nature, and are not intended to limit the scope, application, or uses of the invention.

<Configuration of Air-Conditioning System>

FIG. 1 illustrates an exemplary configuration of an air-conditioning system (100) according to an embodiment. The air-conditioning system (100) achieves air conditioning in a target space included in a structure, such as a house, a building, a factory, or a public facility.

In this embodiment, the air-conditioning system (100) is used for a building (BL) including a plurality of (for example, two) target spaces (SP1, SP2). The target spaces (SP1) and (SP2) may be separate indoor spaces or different spaces in the same room. The building (BL) includes a machine chamber (BL1) where an outside air processing device (10) described below is disposed, an exclusive section (BL2) including the target spaces (SP1, SP2), and a corridor (BL3) interposed between the machine chamber (BL1) and the exclusive section (BL2).

As illustrated in FIG. 1, the air-conditioning system (100) includes the outside air processing device (10), an air-conditioning device (20), and a controller (30). The outside air processing device (10) adjusts the temperature and humidity of outside air (OA) taken thereinto, and then supplies the adjusted air to the target spaces (SP1, SP2). The outside air (OA) is air outside the target spaces (SP1, SP2), and is air outside the building (BL) in this embodiment. The air-conditioning device (20) adjusts the temperatures of air, i.e., inside air (IA), in the target spaces (SP1, SP2).

In the air-conditioning system (100), the operating states of the outside air processing device (10) and the air-conditioning device (20) are changed by entering commands as appropriate into remote controls (40) installed in the respective target spaces (SP1, SP2). The controller (30) controls the operating states of the outside air processing device (10) and the air-conditioning device (20) in accordance with the commands entered into the remote controls (40) (commands related to start/stop, the type of operation, a set temperature, a set airflow rate, and other elements), the temperatures and humidities of the outside air (OA) and the inside air (IA), and other parameters.

<Configuration of Outside Air Processing Device>

The outside air processing device (10) includes, as main components, an air handling unit (11) and a chiller unit (not shown) serving as a heat source unit. The air handling unit (11) may be a water-operated air handling unit or a refrigerant-operated air handling unit (a direct expansion air handling unit).

The outside air processing device (10) in operation takes outside air (OA) from an intake port (15) formed in an outer wall of the building (BL) through an intake duct (L1) into the air handling unit (11), cools or heats, or dehumidifies or humidifies, the taken air, and supplies the resultant air as supply air (SOA) through an air supply duct (L2) and air supply ports (16) to the target spaces (SP1, SP2).

The outside air processing device (10) uses an exhaust fan (17) to release exhaust air (EA) from exhaust ports (not shown) of the target spaces (SP1, SP2) through an exhaust duct (L3) to the outside of the building (BL).

The air handling unit (11) includes, as main components, an outside air heat exchanger (12), a humidifier (13), and an air supply fan (14). The outside air heat exchanger (12) is a heat exchanger that functions as a cooler for the outside air (OA), and includes heat transfer tubes and heat transfer fins. The outside air heat exchanger (12) exchanges heat between outside air (OA) passing through an area surrounding the heat transfer tubes and the heat transfer fins and a heating medium passing through the heat transfer tubes. The humidifier (13) humidifies the outside air (OA) that has passed through the outside air heat exchanger (12). The system and model of the humidifier (13) is not specifically limited. For example, a typical natural evaporation (vaporizing) humidifier may be used. The air supply fan (14) is a blower used to take outside air (OA) into the air handling unit (11) and to send the taken air to the air supply duct (L2). The model of the air supply fan (14) is not specifically limited. For example, a sirocco fan may be used. The air supply fan (14) includes a fan motor, which is controlled by an inverter to adjust the number of revolutions of the fan motor. That is, the air supply fan (14) can change the airflow rate.

The air handling unit (11) includes various sensors, such as an outside-air temperature sensor and an outside-air humidity sensor that detect the temperature and humidity of outside air (OA) sucked into the air handling unit (11), and a supply-air temperature sensor that detects the temperature of supply air (SOA) sent to the air supply duct (L2) (i.e., the target spaces (SP1, SP2)).

The air supply duct (L2) is a member that forms a flow path for outside air (OA). The air supply duct (L2) has its one end connected to the air handling unit (11) so that the air supply fan (14) driven allows outside air (OA) to flow into the air supply duct (L2). The other end of the air supply duct (L2) branches into a plurality of branches, and communicates with the target spaces (SP1, SP2) at respective destinations of the branches. Specifically, the other end (respective destinations of the branches) of the air supply duct (L2) is connected to the air supply ports (16) formed in the ceilings of the target spaces (SP1, SP2).

The outside air processing device (10) has a control unit (31) for outside air conditioner. The control unit (31) for outside air conditioner controls operations of components included in the outside air processing device (10). The control unit (31) for outside air conditioner includes a central processing unit (CPU), a memory, and various electric components. The control unit (31) for outside air conditioner is connected to components included in the outside air processing device (10) through wires. The control unit (31) for outside air conditioner is electrically connected to the controller (30) and the remote controls (40) through communication lines. In this embodiment, the control unit (31) for outside air conditioner is configured by electrically connecting a microcomputer and an associated electric component which are arranged in the air handling unit (11) or the chiller unit (not shown).

The control unit (31) for outside air conditioner sets a target value of the supply air temperature in accordance with the set temperature, the supply air temperature, and other parameters, and adjusts operations of the components as appropriate based on the target value. The operating capacity (air conditioning capacity) of the outside air processing device (10) is changed as appropriate in this manner. The target value of the supply air temperature may be set by the controller (30).

<Configuration of Air-Conditioning Device>

The air-conditioning device (20) includes a refrigerant circuit. A refrigerant is circulated through the refrigerant circuit to perform a vapor compression refrigeration cycle, thereby achieving air conditioning, such as cooling, dehumidification, or heating of the target spaces (SP1, SP2). The air-conditioning device (20) has a plurality of operating modes, and operates in accordance with the operating modes. Specifically, the air-conditioning device (20) performs operations, such as a cooling operation for cooling, a dehumidifying operation for dehumidification, and a heating operation for heating.

The air-conditioning device (20) includes, as main components, a single outdoor unit (21) serving as a heat source unit, and a plurality of (e.g., two) indoor units (22). The model of the air-conditioning device (20) is not specifically limited. For example, a variable refrigerant volume (VRV) air-conditioning device may be used.

In the air-conditioning device (20), the outdoor unit (21) and the indoor units (22) are connected together via a connection pipe (23) to form a refrigerant circuit. The refrigerant enclosed in the refrigerant circuit is not specifically limited. For example, a hydrofluorocarbon (HFC) refrigerant, such as a refrigerant R32 or R410A, may be used.

The outdoor unit (21) is disposed outside the target spaces (SP1, SP2), and is disposed outside the building (BL) in this embodiment. Although not shown, the outdoor unit (21) includes, as main components, a compressor, a four-way switching valve, an outdoor heat exchanger, and an outdoor fan. The compressor compresses a low-pressure refrigerant in the refrigeration cycle to a high-pressure refrigerant. The four-way switching valve is a flow path switching means configured to change the flow direction of the refrigerant in the refrigerant circuit. The outdoor heat exchanger exchanges heat between an air flow passing therethrough (an outdoor air flow produced by the outdoor fan) and the refrigerant. The outdoor heat exchanger functions as a condenser or a radiator for the refrigerant in a normal cycle of operation (the cooling operation and the dehumidifying operation), and as an evaporator for the refrigerant in a reverse cycle of operation (the heating operation). The outdoor fan produces an outdoor air flow. The outdoor air flow is a flow of outside air that flows into the outdoor unit (21), passes through the outdoor heat exchanger, and flows out of the outdoor unit (21). The outdoor air flow is a cooling source of the refrigerant in the outdoor heat exchanger during the normal cycle of operation, and is a heating source of the refrigerant in the outdoor heat exchanger during the reverse cycle of operation. The outdoor fan includes a fan motor, which is controlled by an inverter to adjust the number of revolutions of the fan motor. That is, the outdoor fan can change the airflow rate.

The outdoor unit (21) includes various sensors, such as a suction pressure sensor configured to detect the pressure of the refrigerant sucked into the compressor and a discharge pressure sensor configured to detect the pressure of the refrigerant discharged from the compressor.

The indoor units (22) are disposed in the corresponding target spaces (SP1, SP2). Specifically, in this embodiment, the two indoor units (22) are connected in parallel to the single outdoor unit (21). The model of each indoor unit (22) is not specifically limited. For example, the indoor unit (22) may be a ceiling-mounted indoor unit mounted on the ceiling of the associated target space (SP1, SP2). In this case, each indoor unit (22) is installed in the associated target space (SP1, SP2) such that its inlet and outlet are exposed from the ceiling.

Although not shown, each indoor unit (22) includes an indoor heat exchanger, an expansion valve, and an indoor fan. The indoor heat exchanger exchanges heat between an air flow passing therethrough (an indoor air flow produced by the indoor fan) and the refrigerant. The indoor heat exchanger functions as an evaporator for the refrigerant in the normal cycle operation, and as a condenser or a radiator for the refrigerant in the reverse cycle of operation. The expansion valve is a valve that functions as a pressure reducer or a flow rate regulator for the refrigerant, such as an electric expansion valve capable of controlling its opening degree, and is disposed between the indoor heat exchanger and a liquid-side connection pipe. The indoor fan produces an indoor air flow. The indoor air flow is a flow of inside air that flows into the indoor unit (22), passes through the indoor heat exchanger, and flows out of the indoor unit (22). The indoor air flow is a heating source of the refrigerant in the indoor heat exchanger during the normal cycle of operation, and is a cooling source of the refrigerant in the indoor heat exchanger during the reverse cycle of operation. The indoor fan includes a fan motor, which is controlled by an inverter to adjust the number of revolutions of the fan motor. That is, the indoor fan can change the airflow rate.

Each indoor unit (22) includes various sensors, such as an indoor temperature sensor, an indoor humidity sensor, and a carbon dioxide concentration sensor configured to detect the temperature, humidity, and carbon dioxide concentration, respectively, of an indoor air flow (inside air) sucked into the indoor unit (22), and a refrigerant temperature sensor configured to detect the temperature of the refrigerant in the indoor heat exchanger.

The air-conditioning device (20) has a control unit (32) for air conditioner. The control unit (32) for air conditioner controls operations of components included in the air-conditioning device (20). The control unit (32) for air conditioner includes a CPU, a memory, and various electric components. The control unit (32) for air conditioner is connected to components included in the air-conditioning device (20) through wires. The control unit (32) for air conditioner is electrically connected to various sensors arranged in each indoor unit (22). The control unit (32) for air conditioner is communicably connected to the remote controls (40) installed in the respective target spaces (SP1, SP2). The control unit (32) for air conditioner is electrically connected to the controller (30) and the remote controls (40) through communication lines.

In this embodiment, the control unit (32) for air conditioner is configured by electrically connecting microcomputers and associated electric components which are each arranged in the outdoor unit (21) and the indoor units (22). The control unit (32) for air conditioner sets a target value of the evaporation temperature in each indoor unit (21) in accordance with the conditions, such as the set temperature and the indoor temperature, and adjusts the capacity of the compressor, the airflow rate of the outdoor fan, and other parameters as appropriate based on the target value. The operating capacity (air conditioning capacity) of the air-conditioning device (20) is changed as appropriate in this manner. The target value of the evaporation temperature may be set by the controller (30).

<Controller and Remote Control>

The controller (30) is a functional unit that controls an operation of the air-conditioning system (100) as a whole. Specifically, the controller (30) includes a computer including a memory, a CPU, or any other elements. The computer executes a program to perform the functions of the air-conditioning system (100). The program is recorded in a computer-readable recording medium, such as a read only memory (ROM).

The controller (30) is electrically connected to the control unit (31) for outside air conditioner and the control unit (32) for air conditioner, and transmits and receives signals to and from these units. The controller (30) transmits a predetermined signal (e.g., a control signal for setting a target supply air temperature or a target evaporation temperature) to the control unit (31) for outside air conditioner and the control unit (32) for air conditioner, thereby making it possible to control operations of components that constitute the outside air processing device (10) and the air-conditioning device (20). The controller (30) receives a predetermined signal transmitted from each of the control unit (31) for outside air conditioner and the control unit (32) for air conditioner, thereby making it possible to acquire detection values of various sensors disposed in the outside air processing device (10) and the air-conditioning device (20), and information determining the operating states of the outside air processing device (10) and the air-conditioning device (20).

The remote controls (40) are input devices to which a user inputs various commands for changing the operating states (start/stop, the type of operation, the set temperature, the set humidity, the set airflow rate, and other parameters) of the outside air processing device (10) and the air-conditioning device (20) individually. Each of the remote controls (40) also functions as a display for displaying predetermined information (such as the operating states of the outside air processing device (10) and the air-conditioning device (20) and the temperatures and humidities of inside air and outside air).

<Control of Air-Conditioning System Under Low Load>

The outside air processing device (10) and air-conditioning device (20) of the air-conditioning system (100) each have an independent heat source. When both of the outside air processing device (10) and the air-conditioning device (20) are performing the cooling operation (which may be dehumidification) or heating operation (which may be humidification), the outside air processing device (10) changes the supply air temperature by supply air temperature control and in accordance with the load, thereby adjusting the cooling capacity or the heating capacity of the outside air processing device (10) and the air-conditioning device (20).

In a known air-conditioning system that is a combination of an outside air processing device and an air-conditioning device, these devices are basically controlled independently of each other. The outside air processing device is activated or deactivated based on the conditions of outside air, and the air-conditioning device is activated or deactivated based on the conditions of indoor temperature.

In contrast, in this embodiment, the controller (30) stops operation of either the outside air processing device (10) or the air-conditioning device (20) if the temperature/humidity state that is at least either the temperature or humidity of air in each target space (SP1, SP2) is within a predetermined range, and if the load factor of at least one of the outside air processing device (10) or the air-conditioning device (20) is below a predetermined lower limit. The heat source of each device may be turned off under thermostat control to stop the operation of the device.

Whether or not the temperature/humidity state of each of the target spaces (SP1, SP2) is within the predetermined range may be determined as follows, for example. First, the temperature of air in each target space (SP1, SP2) (hereinafter referred to as "indoor temperature") is determined to be within the predetermined range, if the relation of "set temperature+α≥indoor temperature≥set temperature−α" is satisfied, where α represents a predetermined value (e.g., 1° C.). If this relation is not satisfied, the indoor temperature is determined to be outside the predetermined range. The humidity of the air in each target space (SP1, SP2) (hereinafter referred to as "indoor humidity") is determined to be within the predetermined range, if the relation of "target humidity+β≥indoor humidity≥target humidity−β" is satisfied, where β represents a predetermined value (e.g., 5%). If this relation is not satisfied, the indoor humidity is determined to be outside the predetermined range. The humidity may be either an absolute humidity or a dew point temperature.

The load factor of each of the outside air processing device (10) and the air-conditioning device (20) may be, for example, "the ratio of the present processing capacity to the rated capacity." Alternatively, the load factor of the outside air processing device (10) may be "the load factor of a chiller unit serving as a heat source," and the load factor of the air-conditioning device (20) may be "the load factor of the outdoor unit (21) serving as a heat source." The lower limit of the load factor (e.g., 10%) may be independently set for each of the outside air processing device (10) and the air-conditioning device (20) in consideration of a decrease in the COP and other factors.

If the load factor of one of the outside air processing device (10) or the air-conditioning device (20) is below a predetermined lower limit, and if the load factor of the other device is greater than or equal to the predetermined lower limit, operation of the one of these devices may be stopped. For example, if the load factor of only the outside air processing device (10) is below the predetermined lower limit, the heat source of the outside air processing device (10) is turned off under thermostat control. If the load factor of only the air-conditioning device (20) is below the predetermined lower limit, the heat source of the air-conditioning device (20) is turned off under thermostat control.

Alternatively, if the load factors of both of the outside air processing device (10) and the air-conditioning device (20) are below the predetermined lower limit, operation of one of the outside air processing device (10) or the air-conditioning device (20) that has a lower ratio of the load factor to the predetermined lower limit, or operation of a preset one of these devices may be stopped.

If the temperature/humidity state of each target space (SP1, SP2) is outside the predetermined range after a predetermined period of time has elapsed since the operation of either one of the outside air processing device (10) or the air-conditioning device (20) is stopped, the controller (30) may restart the operation of the device whose operation has been stopped.

The controller (30) may stop the operation of either one of the outside air processing device (10) or the air-conditioning device (20), and may forcibly increase the air conditioning capacity (cooling capacity or heating capacity) of the other device that keeps operating. To increase the air conditioning capacity of the outside air processing device (10), operating parameters, such as the supply air temperature and the volume of air to be processed, are changed. This can easily increase the air conditioning capacity of the outside air processing device (10). To increase the air conditioning capacity of the air-conditioning device (20), operating parameters, such as the airflow rates of the indoor units (22), the evaporation temperature, and the condensation temperature, are changed. This can easily increase the air conditioning capacity of the air-conditioning device (20). In a case in which the environments of the target spaces (SP1, SP2) become worse under a set value condition for the device that keeps operating, the set value may be changed to maintain the environments of the target spaces (SP1, SP2) and thereby increase the air conditioning capacity of the device that keeps operating.

In a case in which the air-conditioning device (20) has a plurality of indoor units (22) as in this embodiment, the controller (30) may stop the operation of the air-conditioning device (20) if the load factor of the air-conditioning device (20) is below the predetermined lower limit and if the operation factor of the indoor units (22) (="the number of indoor units (22) operating"/"the number of the indoor units (22) installed") is greater than or equal to a predetermined operation factor. In other words, even when the load factor of the air-conditioning device (20) is below the predetermined lower limit, the operation of the air-conditioning device (20) is not stopped if the operation factor of the indoor units (22) does not reach the predetermined factor. The predetermined operation factor may be determined in consideration of the number of indoor units (22) installed or other parameters.

In the case in which the operation of the air-conditioning device (20) is stopped, the controller (30) may change the operating mode of the outside air processing device (10) from supply air temperature control to return air temperature control or indoor temperature control.

An exceptional setting may be made in the controller (30). According to the exceptional setting, even when the load factor of the air-conditioning device (20) is below the predetermined lower limit, the operation of the air-conditioning device (20) is not stopped if a specific one of the indoor units (22) is operating in a private room or any similar space.

<Control of Air-Conditioning System Under High Load>

If the temperature/humidity state that is at least either the temperature or humidity of air in each target space (SP1, SP2) is within a predetermined range, and if the load factor of one of the outside air processing device (10) or the air-conditioning device (20) is above a predetermined upper limit and the load factor of the other device is below the predetermined upper limit, the controller (30) reduces the air conditioning capacity of the one of the devices and increases the air conditioning capacity of the other device. The upper limit of the load factor (e.g., 95%) may be independently set for each of the outside air processing device (10) and the air-conditioning device (20) in consideration of a decrease in the COP and other factors.

The air conditioning capacity of each of the outside air processing device (10) and the air-conditioning device (20) may be changed by adjusting the supply air temperature of the outside air processing device (10), for example. Specifically, in a case in which the load factor of the outside air processing device (10) is greater than the predetermined upper limit during heating, part of the air conditioning capacity (heating capacity) may be transferred from the outside air processing device (10) to the air-conditioning device (20) by lowering the supply air temperature of the outside air processing device (10). In a case in which the load factor of the air-conditioning device (20) is greater than the predetermined upper limit during heating, part of the air conditioning capacity (heating capacity) may be transferred from the air-conditioning device (20) to the outside air processing device (10) by increasing the supply air temperature of the outside air processing device (10). In a case in which the load factor of the outside air processing device (10) is greater than the predetermined upper limit during cooling, part of the air conditioning capacity (cooling capacity) may be transferred from the outside air processing device (10) to the air-conditioning device (20) by increasing the supply air temperature of the outside air processing device (10). In a case in which the load factor of the air-conditioning device (20) is greater than the predetermined upper limit during cooling, part of the air conditioning capacity (cooling capacity) may be transferred from the air-conditioning device (20) to the outside air processing device (10) by lowering the supply air temperature of the outside air processing device (10).

Advantages of Embodiment

According to the air-conditioning system (100) of this embodiment, operation of either one of the outside air processing device (10) or the air-conditioning device (20) is stopped if the temperature/humidity state that is at least one of the temperature or humidity of air in the target space (SP1, SP2) is within a predetermined range and if the load factor of at least one of the outside air processing device (10) or the air-conditioning device (20) is below a lower limit. In other words, in a case in which the load factor of at least either one of the outside air processing device (10) or the air-conditioning device (20) is below the predetermined lower limit, operation of either one of the outside air processing device (10) or the air-conditioning device (20) is stopped on condition that the temperature/humidity state of each target space (SP1, SP2) is within the predetermined range. Thus, the air-conditioning system (100) can be efficiently operated while being prevented from operating at low COP, without worsening the temperature/humidity states of the target spaces (SP1, SP2). This enables air-conditioning control that achieves both energy conservation and comfort.

For example, stopping the operation of the heat source of the outside air processing device (10) helps improve the operational efficiency of the air-conditioning system (100) in a case in which the load factor of the outside air processing device (10) decreases due to a small difference between the outside air temperature and the supply air temperature although the condition that allows cooling with outside air is not met during cooling.

If the operation of the air-conditioning device (20) is stopped while the air-conditioning device (20) is operating at low load, it is possible to avoid user discomfort resulting from a temperature change caused by the start/stop of the air-conditioning device (20). In this case, it is also possible to reduce the number of times when the chiller and accessory machines, such as pumps and valves, start and stop. This can extend the lives of these components.

In the air-conditioning system (100) of the embodiment, if the load factor of one of the outside air processing device (10) or the air-conditioning device (20) is below a predetermined lower limit, and if the load factor of the other device is greater than or equal to the predetermined lower limit, stopping the operation of the one of the devices enables appropriate stopping of only the device that is operating at low COP.

In the air-conditioning system (100) of the embodiment, if the load factors of both of the outside air processing device (10) and the air-conditioning device (20) are below the predetermined lower limit, continuous operation at low COP can be avoided by stopping the operation of one of the outside air processing device (10) or the air-conditioning device (20) that has a lower ratio of the load factor to the predetermined lower limit or operation of a preset one of the devices.

In the air-conditioning system (100) of the embodiment, if the temperature/humidity states of the target spaces (SP1, SP2) is outside the predetermined range after a predetermined period of time has elapsed since the operation of either one of the outside air processing device (10) or the air-conditioning device (20) is stopped, it is possible to improve the environment of the target spaces (SP1, SP2) by restarting the operation of the device whose operation has been stopped.

In the air-conditioning system (100) of the embodiment, the environments of the target spaces (SP1, SP2) can be maintained in good condition by stopping operation of either one of the outside air processing device (10) or the air-conditioning device (20) and forcibly increasing an air conditioning capacity of the other device that keeps operating.

In the air-conditioning system (100) of the embodiment, if the load factor of the air-conditioning device (20) is below the predetermined lower limit, and if an operation factor of the plurality of indoor units (22) included in the air-conditioning device (20) is greater than or equal to a predetermined operation factor, stooping the operation of the air-conditioning device (20) provides the following advantage. That is, it is possible to avoid a situation in which the indoor environment of private rooms or any other similar spaces worsens due to stopping the operation of a small number of indoor units (22) which are operating in the private rooms or any other similar spaces, in a case in which although the load factor of the air-conditioning device (20), particularly the outdoor unit (21), is low, the operation factor of the plurality of indoor units (22) is low and the air conditioning capacity of the small number of indoor units (22) operating in the private rooms or any other similar spaces is high.

In the air-conditioning system (100) of the embodiment, in the case in which the operation of the air-conditioning device (20) is stopped, it is possible to maintain the environment of the target space (SP1, SP2) in good condition, while improving energy conservation, by changing the operating mode of the outside air processing device (10) from supply air temperature control to return air temperature control or indoor temperature control.

According to the air-conditioning system (100) of this embodiment, if the temperature/humidity state that is at least either the temperature or humidity of air in each target space (SP1, SP2) is within a predetermined range, and if the load factor of one of the outside air processing device (10) or the air-conditioning device (20) is above a predetermined upper limit and the load factor of the other device is below the predetermined upper limit, the air conditioning capacity of the one of the devices is reduced and the air conditioning capacity of the other device is increased. In other words, if one of the outside air processing device (10) or the air-conditioning device (20) falls in an overloaded state, the air conditioning capacity of the one of the devices is reduced and the air conditioning capacity of the other device is increased, on condition that the temperature/humidity state of the target space (SP1, SP2) is within the predetermined range and that the other device is not in the overloaded state. This configuration makes it possible to adjust the air conditioning capacity of each of the devices and keep the COP from decreasing when the outside air processing device (10) or the air-conditioning device (20) falls in the overloaded state due to the outside air temperature or the indoor load. It is therefore possible to keep the operational efficiency of the air-conditioning system (100) from decreasing.

In the air-conditioning system (100) of the embodiment, it is possible to easily adjust the air conditioning capacity of each of the devices by adjusting a supply air temperature of the outside air processing device (10) and thereby transferring part of the air conditioning capacity from the one of the devices to the other one of the devices.

<First Variation>

In the air-conditioning system (100) of the embodiment, if the temperature/humidity states of the target spaces (SP1, SP2) is outside the predetermined range after a predetermined period of time has elapsed since the operation of either one of the outside air processing device (10) or the air-conditioning device (20) is stopped, the operation of the device whose operation has been stopped is restarted. Alternatively or additionally, the device (heat source) whose operation has been stopped may be restarted if the heat source whose operation has been stopped or the device having this heat source is turned on after a predetermined period of time has elapsed since the operation of the outside air processing device (10) or the air-conditioning device (20) is stopped. It is therefore possible to restart the operation of the air-conditioning device (20) when, for example, operation of the air-conditioning device (20) is stopped during cooling and a user turns on the air-conditioning device (20), feeling that the cooling is not enough.

<Second Variation>

In the air-conditioning system (100) of the embodiment, the operation of either one of the outside air processing device (10) or the air-conditioning device (20) is stopped, and the air conditioning capacity of the other device that keeps operating is forcibly increased. Alternatively, the cooling capacity or heating capacity of the device that keeps operating may be increased under autonomous control of this device or the air-conditioning system (100). As can be seen, single control (e.g., autonomous room temperature control) or another system control (e.g., control for improvement of indoor environment through changes of the supply air temperature in the case of deterioration of the indoor environment) autonomously change the air conditioning capacity of the device that keeps operating. This causes temporary deterioration of the indoor environment, but can keep the device whose air conditioning capacity is to be increased from being affected by an unnecessary disturbance arising from discontinuous operation.

<Third Variation>

In the air-conditioning system (100) of the embodiment, if the load factors of both of the outside air processing device (10) and the air-conditioning device (20) are below the predetermined lower limit, operation of one of the outside air processing device (10) or the air-conditioning device (20) that has a lower ratio of the load factor to the predetermined lower limit, or operation of a preset one of these devices may be stopped. Alternatively or additionally, the heat sources of both of the outside air processing device (10) and the air-conditioning device (20) may be turned off under thermostat control if the load factors of both of the outside air processing device (10) and the air-conditioning device (20) are extremely low. This can reduce the power consumption.

<Fourth Variation>

In the air-conditioning system (100) of the embodiment, the operation of either one of the outside air processing device (10) or the air-conditioning device (20) is stopped (the heat source is forcibly turned off under thermostat control) if the load factor of at least one of the outside air processing device (10) or the air-conditioning device (20) is below the predetermined lower limit. Additionally, the operation of the outside air processing device (10) may be stopped if the condition "supply air temperature of outside air processing device (10)<outside air temperature−t (where t represents a predetermined value, such as 1° C.)" is satisfied during cooling, or if the condition "supply air temperature of outside air processing device (10)>outside air temperature+t" is satisfied during heating. It is therefore possible to avoid the operation of the outside air processing device (10) at low COP.

Other Embodiments

In the foregoing embodiment (including the variations), the outside air processing device (10) has the humidifier (13). However, the outside air processing device (10) does not have to have the humidifier (13). In other words, the outside air processing device (10) may be configured so as not to perform a humidifying operation.

In the foregoing embodiment (including the variations), a case in which the air-conditioning system (100) is used for the building (BL) having two target spaces (SP1, SP2) has been described. However, the environment where the air-conditioning system (100) is installed is not specifically limited. For example, the air-conditioning system (100) may be used for a building having three or more target spaces or for a building having one target space. The number of indoor units (22) may be changed as appropriate in accordance with the number of target spaces. A plurality of indoor units (22) may be arranged in one target space.

In the foregoing embodiment (including the variations), the outside air processing device (10) includes the single air handling unit (11) and the single chiller unit. However, the numbers of the air handling unit (11) and chiller unit of the outside air processing device (10) are not limited to one, and can be changed as appropriate in accordance with the installation environment and design specifications. In other words, the outside air processing device (10) may include a plurality of air handling units (11) and/or a plurality of chiller units. The number of air handling units (11) does not necessarily have to be equal to the number of chiller units.

In the foregoing embodiment (including the variations), the air-conditioning device (20) includes the single outdoor unit (21) and the two indoor units (22). However, the numbers of the outdoor unit (21) and indoor units (22) of the air-conditioning device (20) can be changed as appropriate in accordance with the installation environment and design specifications. In other words, the air-conditioning device (20) may include a plurality of outdoor units (21), or may include three or more indoor units (22) or one indoor unit (22).

In the foregoing embodiment (including the variations), a case in which the indoor units (22) are mounted on the ceilings of the respective target spaces (SP1, SP2) has been described. The model of each indoor unit (22) and how the indoor units (22) are installed are not specifically limited. Each indoor unit (22) may be, for example, a so-called ceiling-hung, wall-mounted, or floor-standing unit.

The positions at which the various sensors of the air-conditioning system (100) are arranged are not limited to those in the foregoing embodiment (including the variations), and can be changed as appropriate. For example, the outside-air temperature sensor, the outside-air humidity sensor, and/or the supply-air temperature sensor do not necessarily have to be arranged in the air handling unit (11), but may be arranged in another unit or may be arranged independently. For example, the indoor temperature sensor, the indoor humidity sensor, and/or the carbon dioxide concentration sensor do not necessarily have to be arranged in the indoor units (22), but may be arranged in another unit or may be arranged independently.

In the foregoing embodiment (including the variations), how the controller (30) is installed has not been specifically described. How the controller (30) is installed can be selected as appropriate. The controller (30) may be disposed, for example, in an administration office of the building (BL), or may be installed in a remote place communicably connected to the building (BL) via a wide area network (WAN) or a local area network (LAN). How the controller (30) is configured may also be changed as appropriate. For example, functional units of the controller (30) do not necessarily have to be arranged collectively, and may be dispersed and connected together via a communication network to form the controller (30). A plurality of devices (such as a personal computer (PC) and a smartphone) may be connected together to form the controller (30). The controller (30) may be configured by being connected to the control unit (31) for outside air conditioner and/or the control unit (32) for air conditioner. The functional units of the controller (30) may be replaced with the control unit (31) for outside air conditioner and/or the control unit (32) for air conditioner.

In the foregoing embodiment (including the variations), a case in which the outside air processing device (10) supplies only outside air (OA) as supply air (SOA) has been described. However, a return air flow path may be formed in the outside air processing device (10) so that a mixture of outside air (OA) and inside air (IA) is supplied as supply air (SOA). The mixing ratio of outside air (OA) and inside air (IA) can be changed as appropriate in accordance with the installation environment and design specifications.

In the foregoing embodiment (including the variations), the outside air processing device (10) is disposed in the machine chamber (BL1). However, the outside air processing device (10) may be installed in the ceiling cavity, under the floor, or on a sidewall, of a target space (SP1, SP2), for example.

In the foregoing embodiment (including the variations), how the air-conditioning system (100) includes the outside air processing device (10) of a single duct system has been described. However, it goes without saying that the air-conditioning system (100) may be configured in other ways.

While the embodiment and variations have been described above, it will be understood that various changes in form and details can be made without departing from the spirit and scope of the claims. The embodiment, the variation thereof, and the other embodiments may be combined and replaced with each other without deteriorating intended functions of the present disclosure.

INDUSTRIAL APPLICABILITY

The present disclosure is useful for an air-conditioning system.

EXPLANATION OF REFERENCES

10 Outside Air Processing Device
11 Air Handling Unit
12 Outside Air Heat Exchanger
13 Humidifier
14 Air Supply Fan
15 Intake Port
16 Air Supply Port
17 Exhaust Fan
20 Air-Conditioning Device
21 Outdoor Unit
22 Indoor Unit
23 Connection Pipe
30 Controller
31 Control Unit For Outside Air Conditioner
32 Control Unit For Air Conditioner
40 Remote Control
100 Air-Conditioner System
SP1, SP2 Target Space
BL Building
BL1 Machine Chamber
BL2 Exclusive Section
BL3 Corridor
L1 Intake Duct
L2 Air Supply Duct

The invention claimed is:

1. An air-conditioning system comprising:
   an indoor temperature/humidity sensor detecting at least either a temperature or a humidity of air in a target space;
   a chiller adjusting at least a temperature of outside air taken into the target space;
   an air-conditioner adjusting at least the temperature of air in the target space, the air-conditioner having a plurality of indoor units; and
   a controller, and a storage storing a program that causes the controller to:
   determine a temperature/humidity state that is at least either the temperature or a humidity of the air in the target space;
   determine
      a load factor of the air-conditioner, and
      an operation factor, the operation factor being a ratio of the indoor units operating among the plurality of indoor units; and
   stop an operation of the air-conditioner: when the determined temperature/humidity state is within a predetermined range; when the determined load factor is below a predetermined lower limit; and when the determined operation factor is greater than or equal to a predetermined operation factor.

2. The air-conditioning system of claim 1, wherein
   when the temperature/humidity state is determined to be outside the predetermined range after a predetermined period of time has elapsed since the operation of the air-conditioner is stopped, the program causes the controller to restart the operation of the air-conditioner.

3. The air-conditioning system of claim 1, wherein the program causes the controller to stop the operation of the air-conditioner, and forcibly increase an air conditioning capacity of the chiller.

4. The air-conditioning system of claim 2, wherein the program causes the controller to stop the operation of the air-conditioner, and forcibly increase an air conditioning capacity of the chiller.

* * * * *